(12) United States Patent
Asai et al.

(10) Patent No.: US 9,836,811 B2
(45) Date of Patent: Dec. 5, 2017

(54) MEMORY CONTROL DEVICE, MOBILE TERMINAL, AND COMPUTER-READABLE RECORDING MEDIUM FOR CONTROLLING WRITING AND READING OF DATA TO FRAME MEMORY

(71) Applicant: Sharp Kabushiki Kaisha, Osaka-shi, Osaka (JP)

(72) Inventors: Junki Asai, Osaka (JP); Kenji Maeda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 151 days.

(21) Appl. No.: 14/423,458

(22) PCT Filed: Aug. 28, 2013

(86) PCT No.: PCT/JP2013/073017
§ 371 (c)(1),
(2) Date: Feb. 24, 2015

(87) PCT Pub. No.: WO2014/038450
PCT Pub. Date: Mar. 13, 2014

(65) Prior Publication Data
US 2015/0235342 A1  Aug. 20, 2015

(30) Foreign Application Priority Data
Sep. 7, 2012 (JP) .................... 2012-197796

(51) Int. Cl.
*G06T 1/60* (2006.01)
*G09G 3/36* (2006.01)

(52) U.S. Cl.
CPC ................ *G06T 1/60* (2013.01); *G09G 3/36* (2013.01); *G09G 2320/0247* (2013.01); *G09G 2360/12* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 6,020,900 A | * | 2/2000 | Flurry | G09G 5/393 345/558 |
| 6,581,164 B1 | * | 6/2003 | Felts, III | G06F 5/12 348/E11.011 |
| 7,106,675 B1 | * | 9/2006 | Hayashi | G11B 19/04 369/53.18 |

(Continued)

FOREIGN PATENT DOCUMENTS

| | | |
|---|---|---|
| JP | 2005-124167 A | 5/2005 |
| JP | 2007-304832 A | 11/2007 |
| JP | 2011-041290 A | 2/2011 |

*Primary Examiner* — Maurice L McDowell, Jr.
*Assistant Examiner* — Donna J Ricks
(74) *Attorney, Agent, or Firm* — Keating & Bennett, LLP

(57) ABSTRACT

A memory control device of the present invention comprises a reset control section (32) for (i) suspending, at a time point where rp overtakes wp or wp overtakes rp or a time point immediately before that time point, a reading operation of data, and (ii) conducting again, at a predetermined time point where reading is to be resumed, the reading operation of the data from a position at which the reading operation has been started in a frame memory (31).

7 Claims, 7 Drawing Sheets

(56) References Cited

U.S. PATENT DOCUMENTS

| | | | |
|---|---|---|---|
| 2002/0027163 A1* | 3/2002 | Haba | H04N 1/00236 |
| | | | 235/454 |
| 2005/0105001 A1* | 5/2005 | Yui | G06F 3/14 |
| | | | 348/441 |
| 2006/0034326 A1 | 2/2006 | Anderson et al. | |
| 2006/0161691 A1 | 7/2006 | Katibian et al. | |
| 2006/0164424 A1* | 7/2006 | Wiley | G09G 5/393 |
| | | | 345/539 |
| 2006/0168496 A1 | 7/2006 | Steele et al. | |
| 2006/0171414 A1 | 8/2006 | Katibian et al. | |
| 2006/0179164 A1 | 8/2006 | Katibian et al. | |
| 2006/0179384 A1 | 8/2006 | Wiley et al. | |
| 2006/0288133 A1 | 12/2006 | Katibian et al. | |
| 2008/0036631 A1 | 2/2008 | Musfeldt | |
| 2011/0249192 A1* | 10/2011 | Shamarao | G09G 5/001 |
| | | | 348/725 |
| 2012/0081385 A1* | 4/2012 | Cote | H04N 5/23219 |
| | | | 345/589 |
| 2013/0322753 A1* | 12/2013 | Lim | G06T 5/001 |
| | | | 382/167 |

\* cited by examiner

US 9,836,811 B2

MEMORY CONTROL DEVICE, MOBILE TERMINAL, AND COMPUTER-READABLE RECORDING MEDIUM FOR CONTROLLING WRITING AND READING OF DATA TO FRAME MEMORY

TECHNICAL FIELD

The present invention relates to a memory control device, a mobile terminal including the memory control device, a memory control program, and a computer-readable recording medium in which the memory control program is stored, each allowing writing, in a frame memory, data transferred from a host processor, and reading data written in the frame memory and transferring the read data to a display panel such as an LCD (Liquid Crystal Display).

BACKGROUND ART

In general, in a case where image data is transferred from a host processor (hereinafter merely referred to as "host") to a display panel such as an LCD, the image data is temporarily stored in a frame memory (hereinafter merely referred to as "memory") in an LCDC (LCD controller) and then output to the display panel. Consequently, when display data is not updated, it is unnecessary to transfer the image data from the host.

However, in a seamless process such as video image reproduction, input (writing) of image data from the host to the LCDC (frame buffer) and output (reading) of image data from the LCDC to the display panel are carried out substantially concurrently.

Consequently, in a case where a difference in transfer rate of image data between input and output cannot be compensated completely, so-called tearing occurs, which is an overtaking phenomenon of image data, in which phenomenon incomplete image data stored in a memory is output to a display panel. Furthermore, the output of incomplete image data to the display panel in the tearing causes flickers in image display.

An example of a prior art for preventing such tearing is a frame rate changing device disclosed in Patent Literature 1. The frame rate changing device includes memory control means for inputting/outputting data into/from a common memory, overtake prediction means for predicting a frame at which output of data from the memory overtakes input of data into the memory, and memory-writing control means for stopping writing of data into the memory when the overtake prediction means predicts that overtaking will occur.

Patent Literature 2 discloses a method for updating a buffer. This is a method for carrying timing information via a communication link between a first processor and a second processor. Furthermore, in this method, the communication link is in a halt mode, and a time event is scheduled in the first processor in order to carry the timing information to the second processor. Furthermore, in this method, link wakeup is started by the first processor when the time event is generated, the second processor detects the link wakeup, and the first processor and the second processor are synchronized with each other with respect to the carried timing information with use of detected link wakeup timing.

Patent Literature 3 discloses a memory accessing device. In the memory accessing device, when a writing process circuit determines that a writable region of the memory is not larger than a size of data to be written in the memory, a process of writing the data is stopped.

CITATION LIST

Patent Literatures

[Patent Literature 1]
 Japanese Patent Application Publication No. 2005-124167 (published on May 12, 2005)
[Patent Literature 2]
 Japanese Patent Application Publication No. 2011-41290 (published on Feb. 24, 2011)
[Patent Literature 3]
 Japanese Patent Application Publication No. 2007-304832 (published on Nov. 22, 2007)

SUMMARY OF INVENTION

Technical Problem

However, the techniques described in Patent Literatures 1-3 above have problems below.

For example, in these techniques, writing into a frame buffer for a single frame and reading from the frame buffer are made concurrently. Consequently, in a frame buffer for display, start of reading for display output cannot be stopped. This necessitates, as in the techniques described in the above documents, (1) Wait for timing when no tearing is expected to occur and then start writing, or (2) Giving up starting writing at timing when tearing is expected to occur.

For example, in the case (1), every time when a host updates image data for display, the host waits for safe timing, and in a worst case, there is a possibility that the host is required to wait for a time equal to one frame at maximum. This causes a problem that since a frame buffer of the host cannot be freed until data transfer for updating image data is completed, the host is required to wait before the host starts to generate image data after next, even if the host has a double buffer structure, resulting in drop frame. Furthermore, even when next image data is not updated, the host cannot stop its operation until image transfer is completed, and consequently power is consumed wastefully for a certain time.

On the other hand, in the case (2), there is no choice other than to give up writing, resulting in drop frame.

The present invention is made in view of the foregoing conventional problems. An object of the present invention is to provide a memory control device etc. capable of avoiding a frame from being dropped, reducing wasteful power consumption, and making tearing less distinctive even if tearing occurs.

Solution to Problem

In order to solve the foregoing problem, a memory control device in accordance with one aspect of the present invention is a memory control device which conducts (i) a writing operation in which data transferred from a host is written in a frame memory and (ii) a reading operation in which the data is read out from the frame memory so as to transfer the data to a display control section, the memory control device comprising: an overtaking time point specifying section for specifying, in a case where a readout period from start of the reading operation to end of the reading operation is different in length from a writing period from start of the writing operation to end of the writing operation, (i) a time point where a read pointer indicative of a current reading position in the frame memory overtakes a write pointer indicative of a current writing position in the frame memory or a time point immediately before the time point or (ii) a time point where the write pointer overtakes the read pointer or a time point immediately before the time point; and a readout reset control section for (i) suspending, at the time point specified by the overtaking time point specifying section, the reading operation of the data, and (ii) conducting again, at a predetermined time point where reading is to be resumed, the reading operation of the data from a position at which the reading operation has been started in the frame memory.

Advantageous Effects of Invention

With one aspect of the present invention, it is possible to avoid a frame from being dropped, reduce wasteful power consumption, and subdue an increase in recording capacity for avoiding the overtaking phenomenon.

For a fuller understanding of the nature and advantages of the invention, reference should be made to the ensuing detailed description taken in conjunction with the accompanying drawings.

DESCRIPTION OF EMBODIMENTS

The following description will discuss an embodiment of the present invention with reference to FIGS. 1 through 7. Descriptions of configurations other than configurations described in specific items below can be omitted according to need. In a case where such configurations are described in other items, the configurations thus omitted are the same as those described in the other items. For convenience, members having the same functions as those described in items are given the same reference signs and their descriptions are omitted appropriately.

[Image Transfer System 1]

Figure 1:
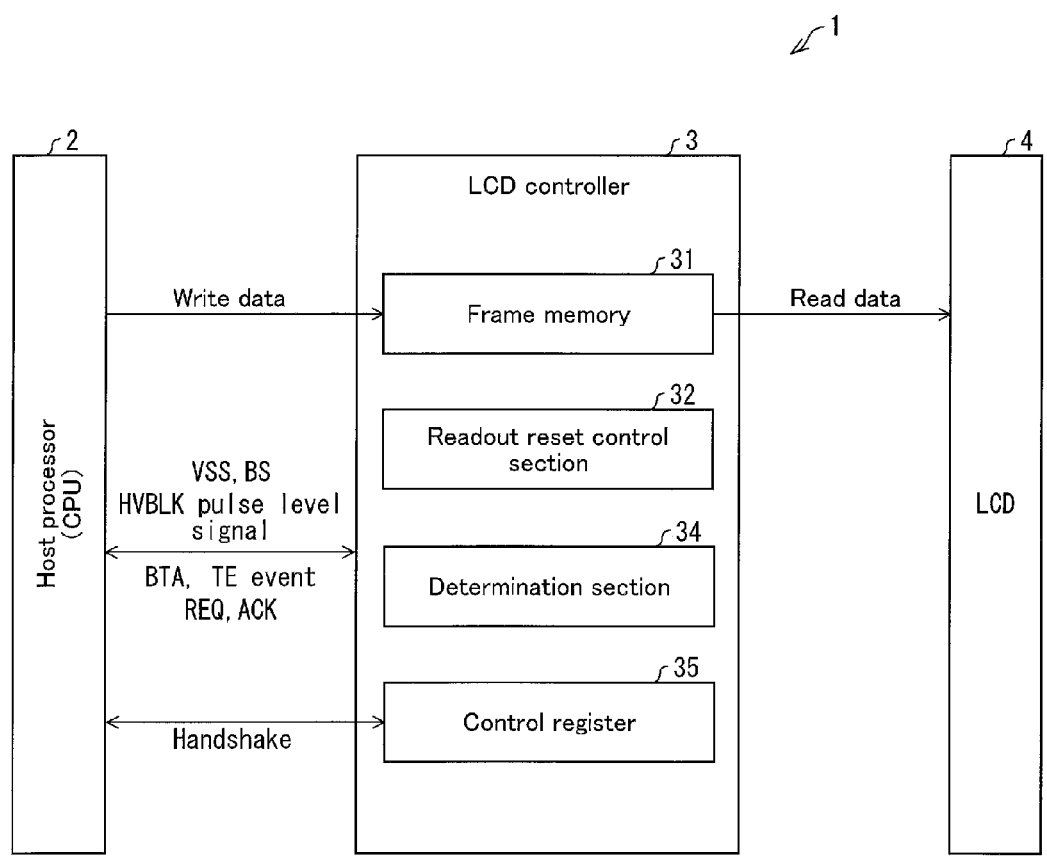
FIG. 1 is a block diagram illustrating an embodiment of a memory control device of the present invention.

Firstly, with reference to FIG. 1, a description will be discussed below as to an image transfer system 1 in accordance with an embodiment of the present invention. FIG. 1 is a block diagram illustrating a configuration of the image transfer system 1.

As illustrated in FIG. 1, the image transfer system 1 includes a host processor (host, memory control device) 2, an LCD controller (memory control device) 3, and an LCD (display control section) 4. The image transfer system 1 in accordance with the present embodiment is a device which conducts (i) a writing operation in which image data (data) transferred from the host processor 2 is written in a frame memory 31 (later described) and (ii) a reading operation in which image data is read out from the frame memory 31 so as to transfer the image data thus read out to the LCD 4. Note that, in the specification, a configuration, in which the LCD 4 (and/or host processor 2) is removed from the image transfer system 1, corresponds to a memory control device in accordance with one embodiment of the present invention.

(Host Processor 2)

The host processor 2 is a host processor (CPU; Central Processing Unit) for a device body (e.g. mobile terminal 10 illustrated in FIG. 2). The host processor 2 carries out an overall control (process) of the device body, and transfers, to the LCD controller 3, (i) image data to be transferred to the LCD 4, (ii) various signals such as a REQ (Request) signal, (iii) various control commands such as a handshake flag and BTA (Bus Turnaround; bus occupancy right), and (iv) packets such as a VSS (Vertical Sync Start) packet and a BS (Blanking Start) packet.

(LCD Controller 3)

The LCD controller 3 has a mechanism for inputting and outputting image data, and carries out processes such as an (i) operation in which image data transferred from the host processor 2 is written in the frame memory 31, and (ii) an operation in which image data is read out from the frame memory 31 so as to transfer the image data thus read out to the LCD 4.

As illustrated in FIG. 1, the LCD controller 3 includes at least the frame memory 31, a readout reset control section 32, a determination section (overtaking time point determining section) 34, and a control register 35.

(Frame Memory 31)

The frame memory 31 is an image memory capable of storing at least image data corresponding to one (1) frame transferred from the host processor 2.

(Readout Reset Control Section 32)

In a case where the determination section 34 (described later) determines (specifies) (a) that the reading operation is higher in operation rate than the writing operation (hereinafter referred to as Tin>Tout) and (b) a time point where the read pointer (hereinafter merely referred to as "rp"), indicative of a current reading position in the frame memory, overtakes the write pointer indicative of a current writing position in the frame memory or a time point immediately before that time point, the readout reset control section 32 (i) suspends the reading operation at the time point thus specified (time point where rp overtakes wp or time point immediately before that time point) and (ii) resumes the reading operation of image data, at a predetermined time point where reading is to be resumed, from a position where the reading operation has been started in the frame memory 31.

To be more specific, the readout reset control section 32 (i) suspends the reading operation and waits, by a time corresponding to an output delay time, from a time point where the writing operation has been started (=Tin−Tout or =Tin−Tout+a predetermined margin), (ii) conducts the reading operation of the image data again from the beginning of a corresponding frame, and then (iii) transfers the image data again to the LCD 4. In this process, Vsync information is transferred again to a liquid crystal driver (not illustrated) of the LCD 4 so as to reset a gate driver (not illustrated). This causes the LCD 4 to be driven again from a first line of a liquid crystal screen.

On the other hand, in a case where the determination section 34 determines (a) that the reading operation is lower in operation rate than the writing operation (hereinafter referred to as Tin<Tout) and (b) a time point where wp overtakes rp or a time point immediately before that time point, the readout reset control section 32 (i) suspends the reading operation at the time point thus specified, and (ii) resumes the reading operation of image data at that time point (time point where reading is to be resumed) from a position where the reading operation has been started in the frame memory 31. To be more specific, the readout reset control section 32 (i) suspends the reading operation and (ii) resumes the reading operation from the beginning of a corresponding frame. In the LCD 4, driving voltages are applied, part of the way, to lines of a liquid crystal panel (not illustrated), but identical driving voltages are applied again to the lines (from the first line through the last line) of the frame, so that the first line through the last line of one (1) frame are driven. The driving voltages, corresponding to one (1) frame, are thus overwritten.

Note that, in a case where Tin>Tout, the "time point where reading is to be resumed" can be (i) a time point which is delayed, by a difference between the writing period and the readout period (Outdly), from a time point where the reading operation is started or (ii) a time point which precedes, by the readout period, a time point where the writing operation is ended (reset delay time).

On the other hand, in a case where Tin<Tout, the "time point where reading is to be resumed" is preferably a time point where the reading operation is suspended.

(Determination Section 34)

The determination section 34 makes various determination processes such as (i) determining whether a time point, where the writing operation starts, falls within a risky period in a case where the readout period Tout and the writing period Tin have different lengths and (ii) specifying (determining) a time point where rp overtakes wp in the frame memory 31 or a time point immediately before that time point and (iii) a time point where wp overtakes rp in the frame memory 31 or a time point immediately before that time point.

In the present embodiment, timing to specify a time point where rp overtakes wp or a time point immediately before that time point or a time point where wp overtakes rp or a time point immediately before that time point is set to a falling edge of Hsync. Note, however, that the timing is not limited to such. For example, a configuration can be alternatively employed in which the determination section 34 always specifies the above time point.

(Control Register 35)

The control register 35 stores control commands supplied from the host processor 2 and transmits a control command stored in the control register 35 to the host processor 2. Examples of the control commands include various data used to, for example, set parameters in sections (circuit). Examples of the various data encompass specified values for calculating an image size, a line size, a frequency, a transfer waiting time, and a risky period. Examples of the control command which the control register 35 supplies to or receives from the host processor 2 encompass a handshake flag.

(Handshake Flag)

When the host processor 2 transfers image data, the host processor 2 changes a handshake flag of the control register 35 from "0" to "1," and then transmits request information to the LCD controller 3. Upon receipt of the request information, the LCD controller 3 changes, when the host processor 2 is ready to transmit data, the handshake flag of the control register 35 from "1" to "0," and then transmits permission information to the host processor 2. After transmitting the request information, the host processor 2 monitors the handshake flag of the control register 35 by polling. When recognizing reception of the permission information, the host processor 2 starts to transfer image data to the LCD controller 3. It is possible to delay a time point to start a writing operation (time point to start DSI (Display Serial Interface) input), normally by adjusting a time period from a time point when the handshake flag is changed to "1" to a time point when the handshake flag is changed to "0."

(LCD 4)

The LCD 4 displays image data transferred from the host processor 2 via the LCD controller 3.

The LCD 4 in accordance with the present embodiment is preferably a liquid crystal panel using a semiconductor oxide (hereinafter referred to as "semiconductor oxide liquid crystal panel." An example of the oxide is an oxide including indium, gallium, and zinc).

[Characteristic Operation of Image Transfer System 1]

(Case where Writing Period Tin>Readout Period Tout)

Next, with reference to FIGS. 3, 5, and 6, a description will be provided below as to a characteristic operation of the image transfer system 1, which operation is conducted in a case where a writing period Tin>a readout period Tout. Before the description of the characteristic operation conducted by the image transfer system 1, a description will be first provided as to definitions of terms important in discussing the following operations.

"Risky period" (indicated by "risky" in FIG. 3) is a time period which has been predetermined based on at least a difference between the readout period Tout and the writing period Tin, with use of, as a reference, a time point where the reading operation ends. Note that the term "at least" is used in consideration of a case where the risky period=(difference between readout period Tout and writing period Tin)+(predetermined margin). Note, however, that, for convenience, the following description is on the premise that the risky period=|readout period Tout−writing period Tin|=writing period Tin−readout period Tout.

"Delay period" indicates a time period which has been predetermined based on the difference between the readout period Tout and the writing period Tin. Note that it is preferable that the "delay period" is equal to or longer than the difference between the readout period Tout and the writing period Tin. For example, the "delay period" can be set such that "delay period"=|readout period Tout−writing period Tin|+(a predetermined margin)=writing period Tin−readout period Tout+(a predetermined margin). For convenience, a description will be provided below based on the premise that "delay period"=|readout period Tout−writing period Tin|=Tin−Tout.

(Flow of Determination on Whether Start of Writing Operation Falls within Risky Period or not and Flow of Readout Reset Control)

Figure 3:
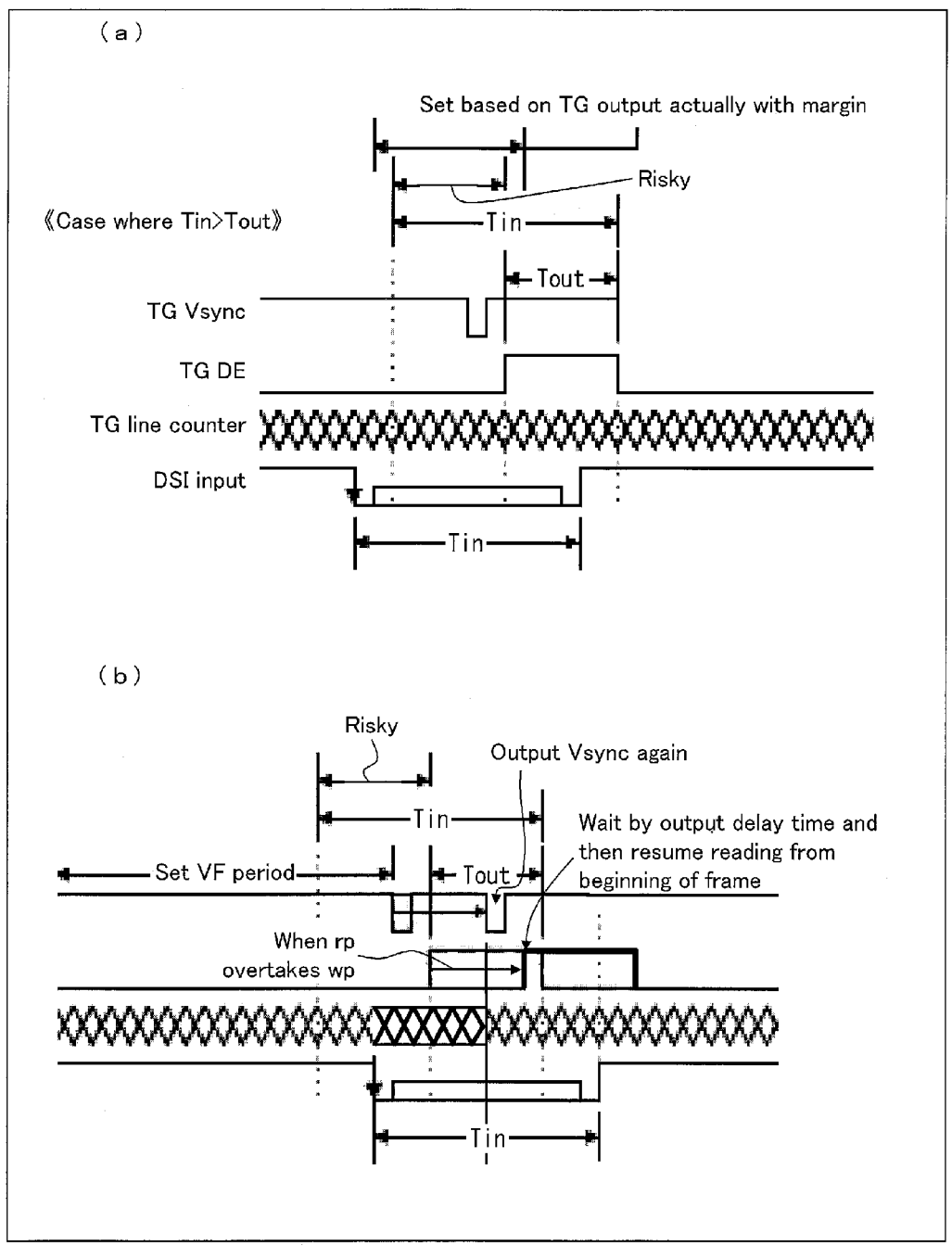
FIG. 3 is a timing chart illustrating examples of an operation of the memory control device. (a) of FIG. 3 illustrates an example of the operation in a case where a time point of start of a writing operation does not fall within a risky period in a case where Tin>Tout. (b) of FIG. 3 illustrates an example of the operation in a case where the time point of start of the writing operation falls within the risky period in the case where Tin>Tout.

(a) and (b) of FIG. 3 are timing charts illustrating respective examples of the operation of the image transfer system 1.

(a) of FIG. 3 first illustrates an example of the operation conducted in a case where a time point of start of a writing operation (a time point indicated by a downward arrow titled "DSI input" or a time point where information, which is always transferred before the writing operation of image data, is received (later described)) does not fall within the risky period.

(b) of FIG. 3 illustrates an example of the operation conducted in a case where the time point of start of the writing operation falls within the risky period.

The example illustrated in (b) of FIG. 3 illustrates an operation conducted in a case where an operation rate of the reading operation>an operation rate of the writing operation (Tin>Tout). In a case where the determination section 34 determines (a) that a time point where the writing operation is started falls within the risky period and (b) specifies a time point where rp overtakes wp in the frame memory 31 or a time point immediately before that time point, the readout reset control section 32 (i) suspends the reading operation at the time point thus specified (time point where rp overtakes wp or time point immediately before that time point), (ii) waits by a time corresponding to the delay period (Tin−Tout) from a time point where the writing operation has been started, and then (iii) conducts the reading operation of image data again from a position where the reading operation has been started in the frame memory 31.

In the present embodiment, a description is provided on the premise that (i) it is determined beforehand whether a time point, where the writing operation is started, falls within the risky period during which tearing is highly likely to occur and (ii) a readout reset control (mentioned later) is carried out only during the risky period. According to this premise, in a case where the time point, where the writing operation is started, does not fall within the risky period (i.e. in a case where tearing is less likely to occur), no readout reset control is carried out. This allows wasteful power consumption to be prevented.

Note, however, that the operation of the determination section 34 does not necessarily include the step of determining whether or not the time point, where the writing operation is started, falls within the risky period as in the present embodiment. For example, in a case where the determination section 34 is configured to specify, regularly or at timing of a falling edge of Hsync, (i) a time point where rp overtakes wp or (ii) a time point which is immediately before that time point, it is unnecessary to determine beforehand whether or not a time point, where the writing operation is started, falls within the risky period.

(Timing Chart for Readout Reset Control)

Figure 5:
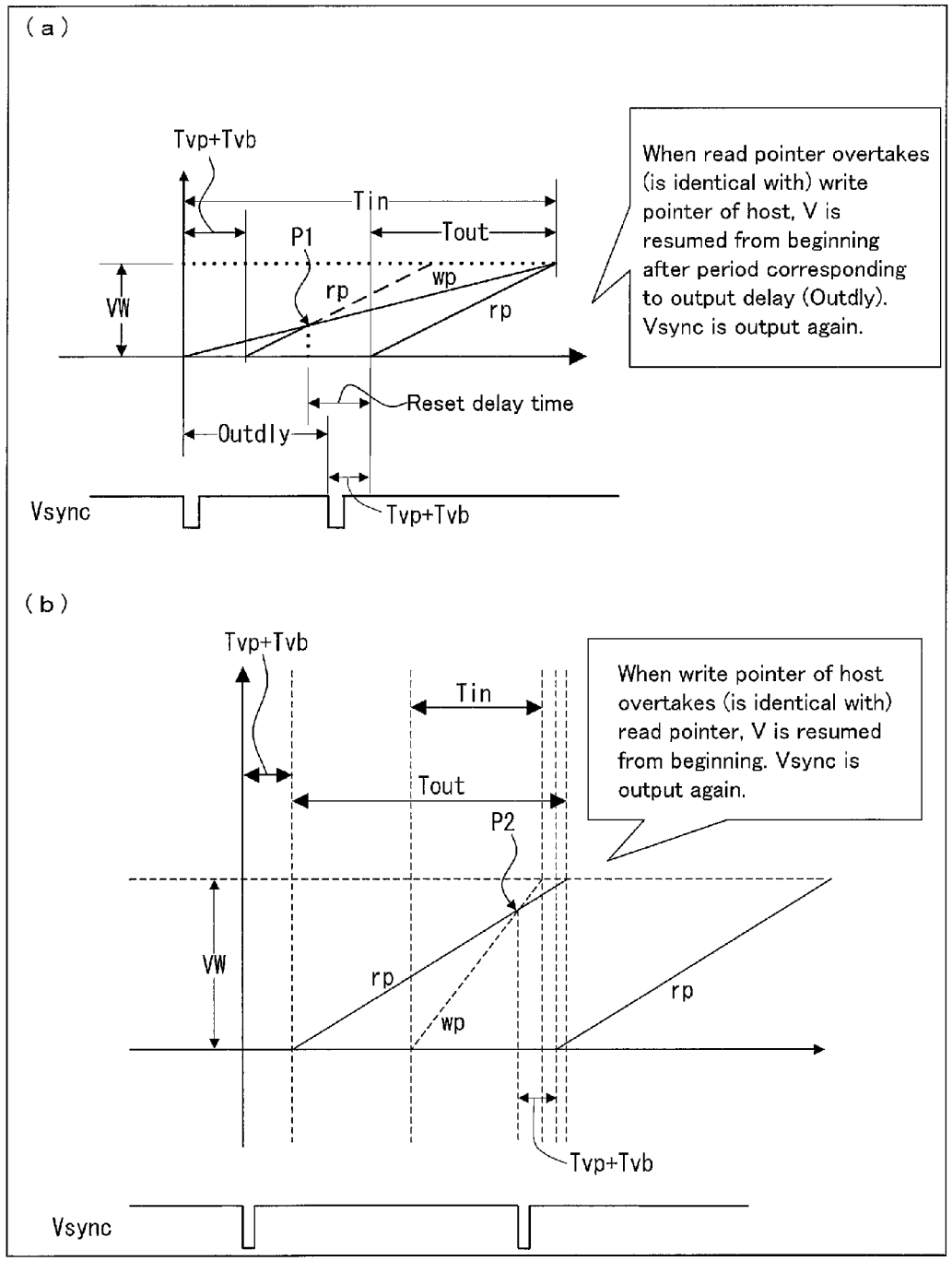
FIG. 5 is a timing chart illustrating examples of how to deal with occurrence of tearing. (a) of FIG. 5 illustrates a case where Tin>Tout. (b) of FIG. 5 illustrates a case where Tin<Tout.

(a) and (b) of FIG. 5 are timing charts illustrating respective examples of how to deal with occurrence of tearing (readout reset control). (a) of FIG. 5 illustrates a case where Tin>Tout.

In a graph illustrated in (a) of FIG. 5, a horizontal axis represents a time, and a vertical axis represents, in the present embodiment, the number of lines of image data which are written into or read out from the frame memory 31. In (a) of FIG. 5, "VW" represents a width of a vertical sync period (here, the number of whole lines of image data recorded in the frame memory 31), and "Tvp+Tvb" represents a time period obtained by summing a vertical sync signal pulse period and a vertical back porch period (here, the number of lines in the reading operation).

Furthermore, "rp" represents a read pointer (current reading position of data in the frame memory 31), and "wp" represents a write pointer (current writing position of data in the frame memory 31).

The graphs, illustrated in (a) of FIG. 5, indicate how rp and wp change with time. The graph, indicated by broken line rp (rp on a left side), corresponds to a state which occurs before the readout reset control is carried out. The graph, indicated by full line rp (rp on a right side), corresponds to a state after the readout reset control is carried out.

A graph, indicated by full line wp in (a) of FIG. 5, crosses, at a point P1, the graph indicated by the broken line rp. This shows that tearing will occur at the point P1.

The graph, indicated by the full line rp, corresponds to the state which occurs after the readout reset control is carried out. The graph, indicated by the full line rp, crosses the graph indicated by full line wp at a point on a line (broken line) which is parallel with and is away, by VW, from the horizontal axis in a plus direction. This shows that no tearing occurs as a result of conducting the reading operation again from the beginning of a corresponding frame.

"Outdly" in (a) of FIG. 5 represents a time period from start of the reading operation of image data to start of the reading operation of the image data for conducting the reading operation again.

"Reset delay time" represents a time period between the time point of the point P1 and a time point which precedes, by the readout period, end of the writing operation.

By setting the "Outdly" or the "reset delay time" as above, it is possible to avoid tearing without keeping the host processor 2 waiting. Even if tearing occurs, it is possible to make the tearing less distinctive by repeatedly outputting and displaying data with no tearing.

(Whole Flow of Readout Reset Control)

Figure 6:
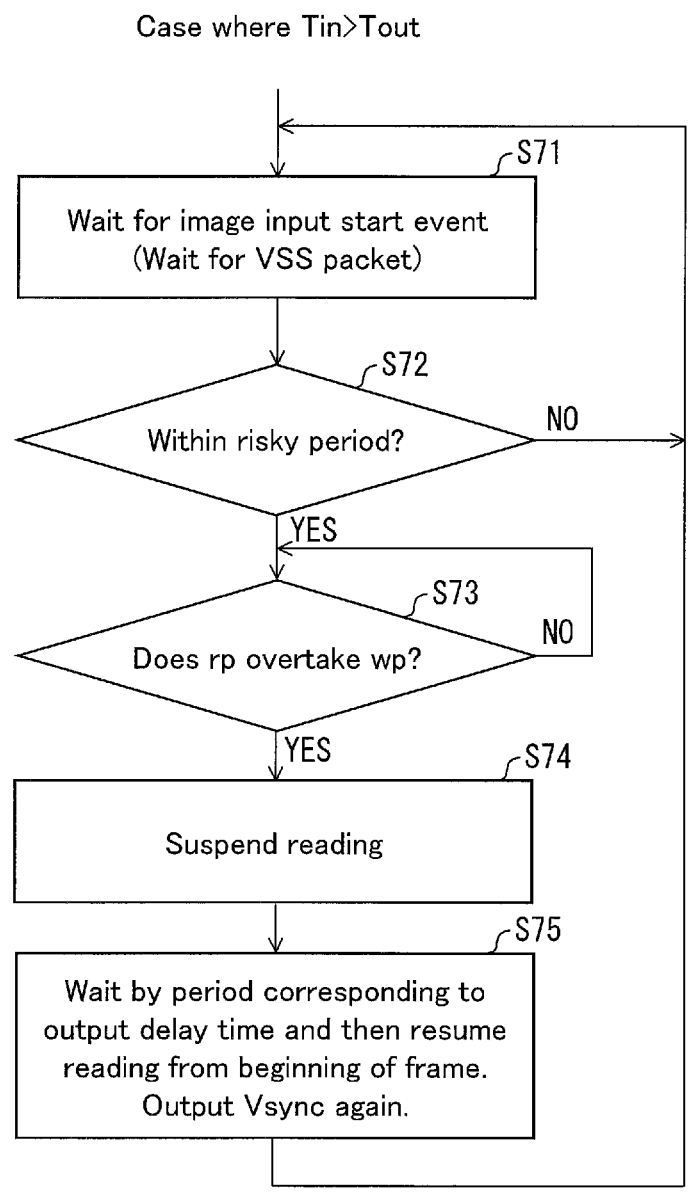
FIG. 6 is a flowchart illustrating an example of a characteristic operation of the memory control device in a case where Tin>Tout.

With reference to FIG. 6, the following description will discuss a whole flow of a readout reset control which is carried out by the LCD controller 3 in a case where Tin>Tout. FIG. 6 is a flow chart illustrating an example of a readout reset control which is carried out by the LCD controller 3 in the operation of the image transfer system 1.

In the step S71 (hereinafter merely referred to as "S71") in FIG. 6, the LCD controller 3 waits for receiving an occurrence of an image input start event from the host processor 2, and then the process proceeds to S72. The "image input start event" is indicative of, for example, a reception of information which is always transferred before the writing operation of image data. The present embodiment will deal with below a case where the information is a VSS (Vertical Sync Start) packet in a DSI (Display Serial Interface) video mode of an MIPI (Mobile Industry Processor Interface) video mode. However, the present invention is not limited to such a case.

Other examples of "information always transferred before the writing operation of data" include (i) a write memory start command in a DCS (Display Command Set) command of an MIPI command mode, (ii) start of a vertical sync signal Vsync in a parallel/LVDS (Low-Voltage Differential Signaling) input, and (iii) a BS (Blanking Start) packet in DP (Display Port).

Figure 4:
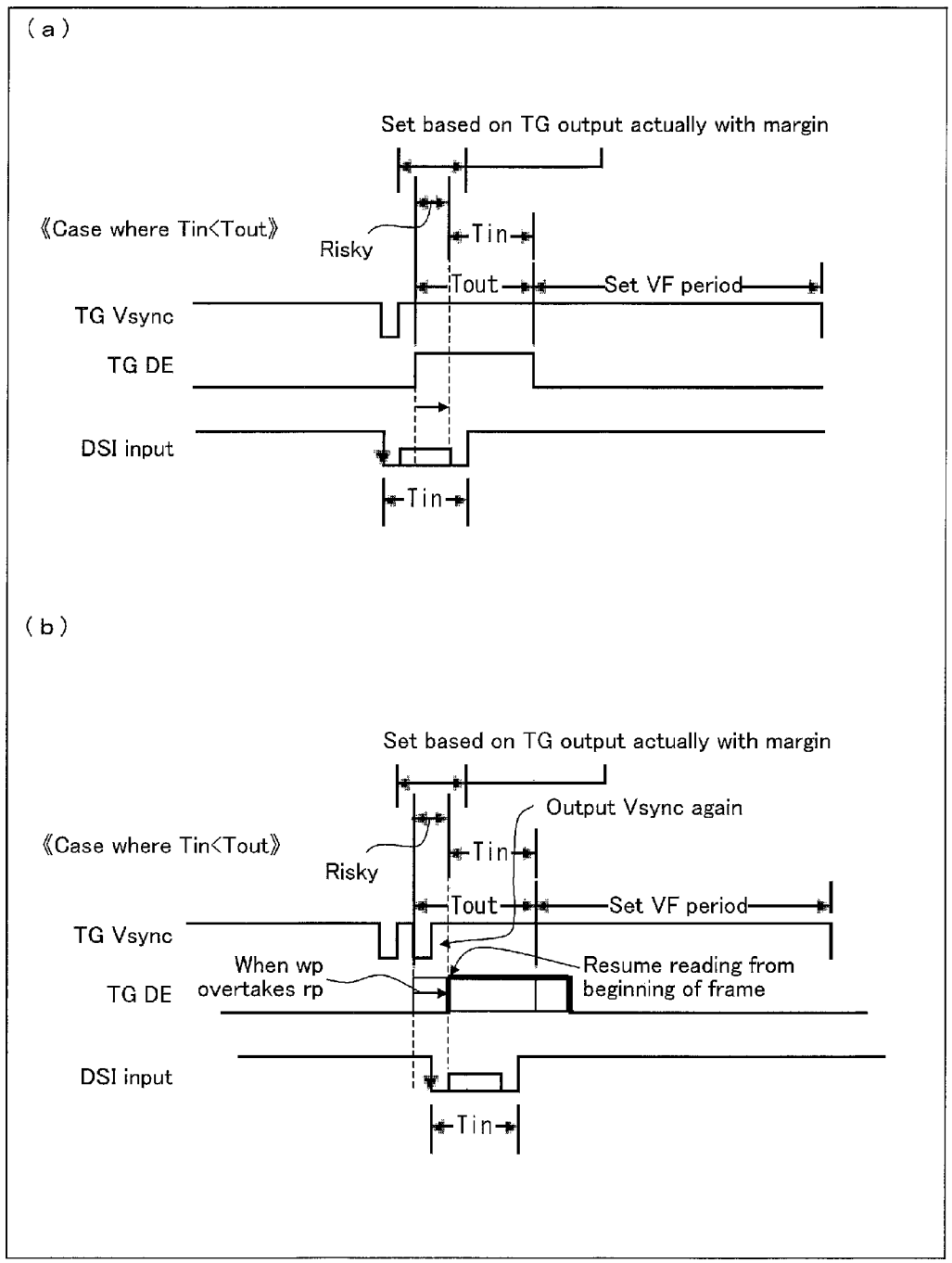
FIG. 4 is a timing chart illustrating examples of the operation of the memory control device. (a) of FIG. 4 illustrates an example of the operation in a case where a time point of start of a writing operation does not fall within a risky period in a case where Tin<Tout. (b) of FIG. 4 illustrates an example of the operation in a case where the time point of start of the writing operation falls within the risky period in the case where Tin<Tout.

In S72, the determination section 34 determines whether or not a time point of start of the writing operation (time point indicated by the downward arrow titled DSI input in FIGS. 3 and 4) falls within the risky period. In a case where it is determined that the time point of start of the writing operation falls within the risky period, the process proceeds to S73 (YES). On the other hand, in a case where the time point of start of the writing operation does not fall within the risky period, the process returns to S71 (NO).

As has been described, the operation in S72 is not necessarily required. For example, in a case where the operation in S72 is unnecessary, a flow can be employed in which the process directly proceeds from S71 to S73. In such a flow, the determination section 34 is configured to monitor rp and wp regularly or at a time point of a falling edge of Hsync.

In S73, in a case where the determination section 34 specifies (determines), at a falling edge of Hsync, a time point where rp overtakes wp in the frame memory 31 (or a time point immediately before that time point), the process proceeds to S74. On the other hand, in a case where the determination section 34 does not specify (determine) a time point where rp overtakes wp in the frame memory 31 (or a time point immediately before that time point), the process returns to S73 again.

In S74, the readout reset control section 32 suspends start of the reading operation by suspending a line counter for generating a line address used in transferring image data to the LCD controller 3, and then the process proceeds to S75.

In S75, the image transfer system 1 waits, by a time period (Tin−Tout) which is delayed from the time point of start of the writing operation, and then starts again the reading operation from the beginning of a corresponding frame.

To be more specific, in a case where rp overtakes wp (in a case where tearing occurs), the image transfer system 1 suspends the reading operation, and conducts the reading operation of the image data again from the beginning of a corresponding frame, and then transfers the image data again to a liquid crystal driver (not illustrated) of the LCD 4.

At that time, by transferring information regarding the Vsync signal (Vsync information) to the liquid crystal driver of the LCD 4 again, the gate driver is reset, and then the LCD 4 is driven again from the first line. In the LCD 4, driving voltages (pixel values of respective pixels) are applied, part of the way, to lines of a frame, but identical driving voltages are applied again to the lines (from the first line through the last line) of the frame so that the first line through the last line of one (1) frame are driven. The driving voltages, corresponding to one (1) frame, are thus overwritten.

(Case where Writing Period Tin<Readout Period Tout)

Figure 7:
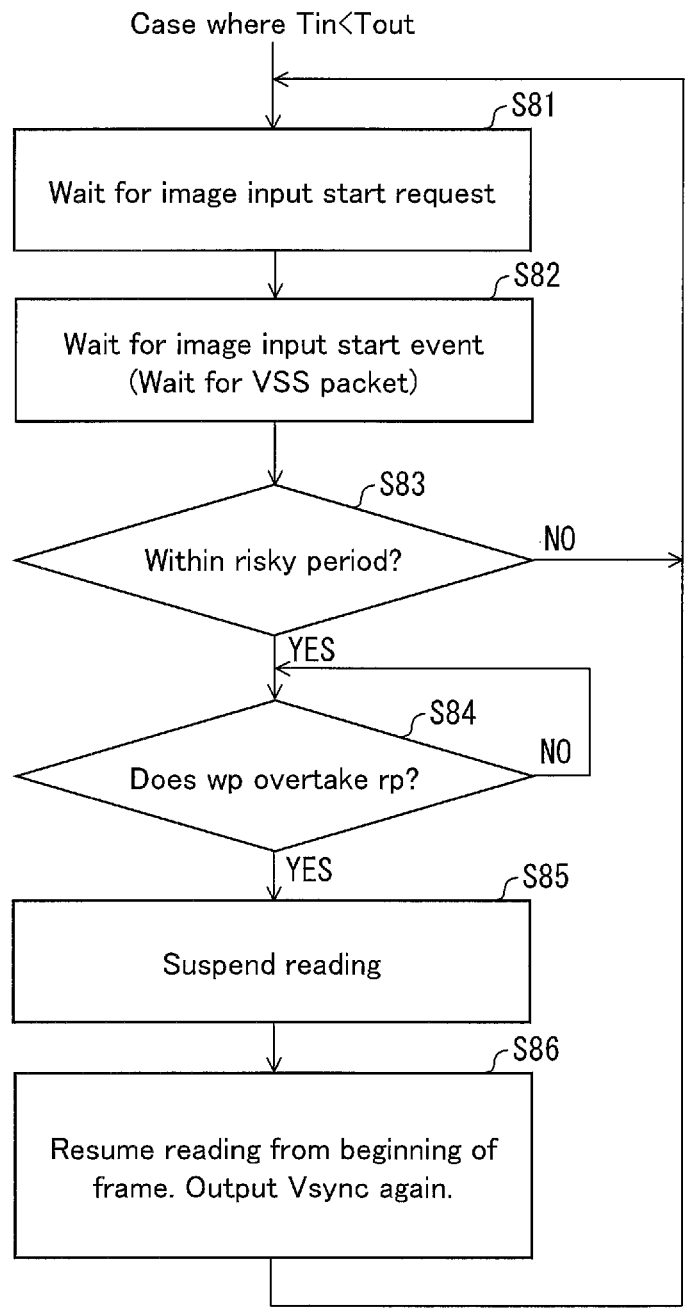
FIG. 7 is a flowchart illustrating an example of a characteristic operation of the memory control device in a case where Tin<Tout.

With reference to FIGS. 4, 5, and 7, the following description will discuss how a characteristic operation of the image transfer system 1 is conducted in a case where the writing period Tin<the readout period Tout.

(Flow of Determination on Whether Start of Writing Operation Falls within Risky Period or not and Flow of Readout Reset Control)

(a) and (b) of FIG. 4 are timing charts illustrating respective examples of the operation of the image transfer system 1.

(a) of FIG. 4 first illustrates an example of the operation conducted in a case where a time point of start of a writing operation (time point indicated by a downward arrow titled "DSI input" in the drawing or a time point where information, which is always transferred before the writing operation of image data, is received (mentioned above)) does not fall within the risky period. (b) of FIG. 4 illustrates an example of the operation conducted in a case where the time point of start of the writing operation falls within the risky period.

The example illustrated in (b) of FIG. 4 illustrates an operation conducted in a case where an operation rate of the reading operation<an operation rate of the writing operation (Tin<Tout). In a case where the determination section 34 determines (a) that a time point where the writing operation is started falls within the risky period and (b) specifies a time point where wp overtakes rp in the frame memory 31 or a time point immediately before that time point, the readout reset control section 32 (i) suspends the reading operation at the time point where wp overtakes rp or the time point immediately before that time point, and (ii) immediately conducts the reading operation of image data again from a position where the reading operation has been started in the frame memory 31.

(Timing Chart of Readout Reset Control)

Next, (b) of FIG. 5 is a timing chart illustrating an example of how to deal with occurrence of tearing (readout reset control) in a case where Tin<Tout.

The graphs illustrated in (b) of FIG. 5 indicate how rp and wp change with time. The graph, indicated by full line rp (rp on a left side. Hereinafter referred to as "left graph of rp"), corresponds to a state before the readout reset control is carried out. The graph, indicated by full line rp (rp on a right side. Hereinafter referred to as "right graph of rp"), corresponds to a state after the readout reset control is carried out.

A graph, indicated by broken line wp in (b) of FIG. 5, crosses the left graph of rp at a point P2. This shows that tearing will occur at the point P2.

The right graph of rp corresponds to the state after the readout reset control is carried out. This shows that no tearing occurs as a result of conducting the reading operation again from the beginning of a corresponding frame.

In the case where Tin<Tout, it is unnecessary to delay the reading operation. It is therefore unnecessary to set "Outdly" or "reset delay time," unlike the case where Tin>Tout. As such, the readout reset control can be carried out immediately (i) at a time point where wp overtakes rp or (ii) at a time point immediately before that time point (note, however, that, in the image transfer system 1 in accordance with the present embodiment, since actual resuming of reading is delayed by Tvp+Tvb from an instruction to resume reading, the readout reset control is delayed, by that time, from (i) the time point where wp overtakes rp or (ii) the time point immediately before that time point).

(Whole Flow of Readout Reset Control)

With reference to FIG. 7, to the following description will discuss a whole flow of a readout reset control which is carried out by the LCD controller 3 in a case where the writing period Tin<the readout period Tout. FIG. 7 is a flow chart illustrating an example of a readout reset control which is carried out by the LCD controller 3 in the case where Tin<Tout in the operation of the image transfer system 1.

In S81 in FIG. 7, the LCD controller 3 waits for receiving an image input start request from the host processor 2, and then the process proceeds to S82.

In S82, the LCD controller 3 waits for receiving an "image input start event" from the host processor 2, and then the process proceeds to S83. The "image input start event" (the VSS packet in the present embodiment) is as has been already described.

In S83, the determination section 34 determines whether or not the time point of start of the writing operation (time point indicated by downward arrow titled DSI input in FIGS. 3 and 4) falls within the risky period. As a result, in a case where the time point of start of the writing operation falls within the risky period, the process proceeds to S84 (YES). On the other hand, in a case where the time point of start of the writing operation does not fall within the risky period, the process returns to S81 (NO).

As has been described, the operation in S83 is not necessarily required. For example, in a case where the operation in S83 is unnecessary, a flow can be employed in which the process directly proceeds from S82 to S84. In such a flow, the determination section 34 is configured to monitor rp and wp regularly or at a time point of a falling edge of Hsync.

In S84, in a case where the determination section 34 specifies (determines) a time point where wp overtakes rp (or a time point immediately before that time point) in the frame memory 31, the process proceeds to S85. On the other hand, in a case where the determination section 34 does not specify (determine) a time point where wp overtakes rp (or a time point immediately before that time point) in the frame memory 31, the process returns to S84 again.

In S85, the readout reset control section 32 suspends start of the reading operation, by suspending a line counter for generating a line address used in transferring image data to the LCD controller 3, and then the process proceeds to S86.

In S86, in a case where the determination section 34 specifies (determines) a time point where wp overtakes rp (or a time point immediately before that time point), the image transfer system 1 conducts the reading operation again from the beginning of a corresponding frame.

To be more specific, in a case where wp overtakes rp (in a case where tearing occurs), the image transfer system suspends the reading operation, and conducts the reading operation of the image data again from the beginning of a corresponding frame and then transfers the image data again to a liquid crystal driver (not illustrated) of the LCD 4.

At that time, by transferring information regarding the Vsync signal (Vsync information) to the liquid crystal driver of the LCD 4 again, the gate driver is reset, and then the LCD 4 is driven again from the first line. In the LCD 4, a driving voltages (pixel values of respective pixels) are applied, part of the way, to lines of a frame, but identical driving voltages are applied again to the lines (from the first line through the last line) of the frame, so that the first line through the last line of one (1) frame are driven. The driving voltages, corresponding to one (1) frame, are thus overwritten.

(Effect of Image Transfer System 1)

With the image transfer system 1, even if the frame memory 31 has recording capacity of only one (1) frame (one screen), the host processor 2 can conduct a writing operation at any time instead of being required to wait at all (wait to transfer image data). Since the host processor 2 is not required to wait, it is possible to suppress judder, prevent a frame from being dropped, and prolong a time period for the host processor 2 to be idle. This allows a reduction in power consumption as a whole. Furthermore, even if the writing operation is slower than the reading operation, it is unnecessary to delay start of the reading operation.

Furthermore, even if tearing occurs, the tearing can be made less distinctive by conducting the reading operation of data again from a position where the reading operation has been started in the frame memory 31.

With the configuration, it is possible to (i) prevent a frame from being dropped, (ii) reduce wasteful power consumption, and (iii) make the tearing less distinctive even if tearing occurs.

Furthermore, in a case where (i) update of imaging by the host processor 2 and (ii) driving of liquid crystal in the LCD 4 overlap each other, a cycle of the vertical sync signal (Vsync) becomes uneven. However, the driving method of the present invention is suitable for a semiconductor oxide liquid crystal panel in which a driving cycle is automatically delayed after driving several frames after updating of imaging.

[Mobile Terminal 10]

Figure 2:
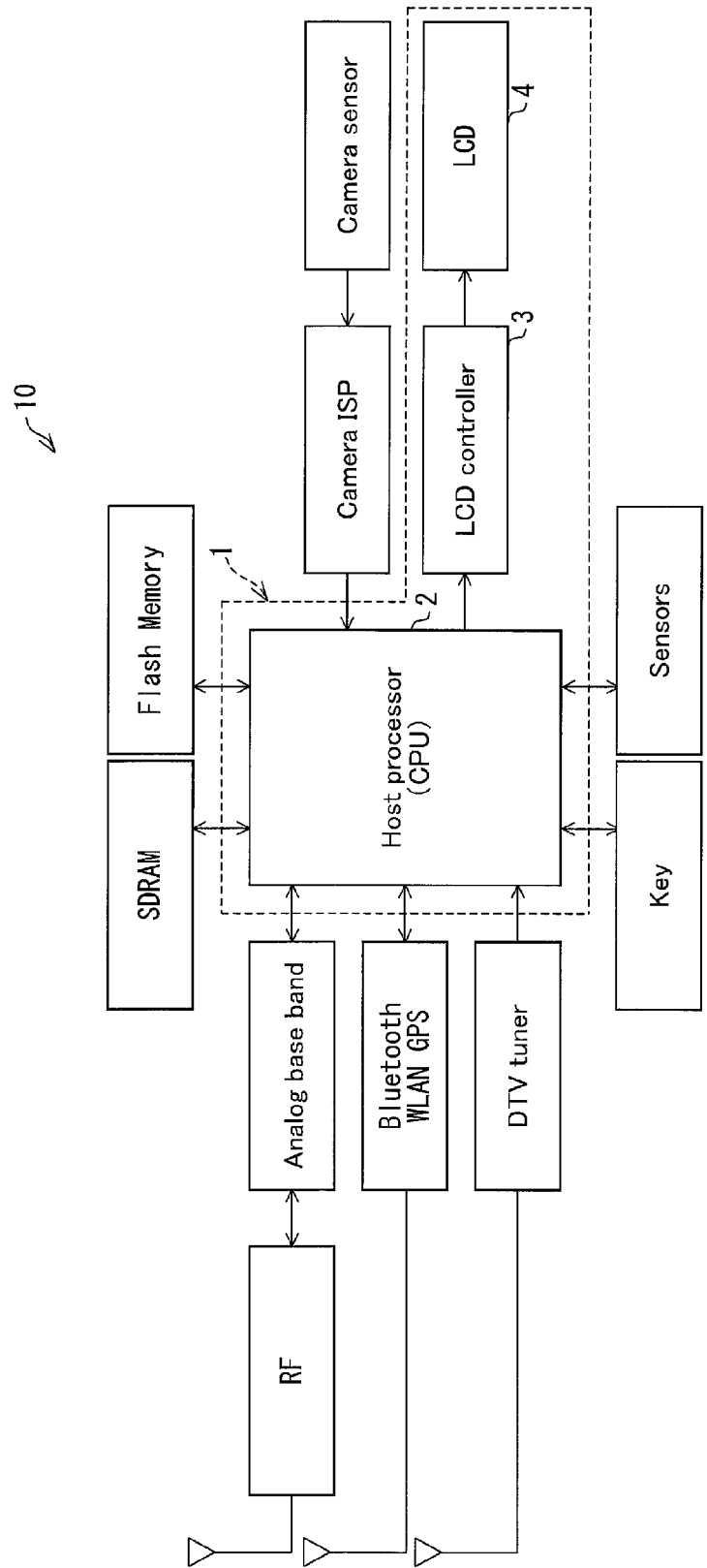
FIG. 2 is a block diagram illustrating an embodiment of a mobile terminal of the present invention (including the memory control device).

Next, with reference to FIG. 2, a description will be discussed below as to the mobile terminal 10 which is another embodiment of the present invention. FIG. 2 is a block diagram illustrating a whole configuration of the mobile terminal 10 including the image transfer system 1.

As illustrated in FIG. 2, the mobile terminal 10 includes, in addition to the image transfer system 1, an SDRAM, a flash memory, a camera sensor, a camera ISP, RF, an analog base band, Bluetooth©, WLAN, GPS (Global Positioning System), a DTV tuner, keys, sensors etc. Note, however, that components, other than the image transfer system 1, are not closely related to an essence of the present invention and so their descriptions are omitted here.

(Effect of Mobile Terminal 10)

Since the mobile terminal 10 in accordance with the present embodiment includes the image transfer system 1, it is possible to realize a mobile terminal capable of avoiding frame from being dropped, reducing wasteful power consumption such as power consumed in a waiting time of the host processor 2, and making tearing less distinctive even if tearing occurs. Other effects of the mobile terminal 10 are the same as those described in the above item titled (Effect of image transfer system 1) and so their descriptions are omitted here.

[Software Implementation Example]

Lastly, blocks of the image transfer system 1, blocks of the LCD controller 3 in particular, may be realized by a logic circuit (hardware) provided in an integrated circuit (IC chip) or may be realized by software as executed by a CPU (Central Processing Unit).

In the latter case, the image transfer system 1 includes: a CPU that executes instructions of a program that is software realizing the foregoing functions (e.g. memory control program); ROM (Read Only Memory) that stores the program; RAM (Random Access Memory) that develops the program; and a storage device (storage medium) storing the program and various kinds of data. The object of the present invention can be realized in such a manner that the image transfer system 1 is provided with a computer-readable storage medium for storing program codes (such as executable program, intermediate code program, and source program) of programs of the image transfer system 1 which programs serve as software for realizing the functions, and a computer (alternatively, CPU or MPU) reads out and executes the program codes stored in the storage medium.

The storage medium is a non-transitory tangible medium which is, for example, tapes such as a magnetic tape and a cassette tape, or discs such as magnetic discs (e.g. a Floppy Disc® and a hard disc), and optical discs (e.g. CD-ROM, MO, MD, DVD, and CD-R), or cards such as an IC card (including a memory card) and an optical card, or semiconductor memories such as mask ROM, EPROM, EEPROM®, and flash ROM, or logic circuits such as PLD (Programmable Logic Device) and FPGA (Field Programmable Gate Array).

Further, the image transfer system 1 may be arranged so as to be connectable to a communication network so that the program code is supplied to the image transfer system 1 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL (Asymmetric Digital Subscriber Line) and (ii) wireless connections such as IrDA and remote control using infrared ray, Bluetooth®, IEEE 802.11, HDR (High Data Rate), NFC (Near Field Communication), DLNA (Digital Living Network Alliance)®, mobile phone network, satellite connections, and terrestrial digital network. Note that the present invention can be also realized by the program codes in the form of a computer data signal embedded in a carrier wave, which is the program that is electrically transmitted.

[Summary]

A memory control device in accordance with first aspect of the present invention is preferably a memory control device which conducts (i) a writing operation in which data transferred from a host is written in a frame memory and (ii) a reading operation in which the data is read out from the frame memory so as to transfer the data to a display control section, the memory control device comprising: an overtaking time point specifying section for specifying, in a case where a readout period from start of the reading operation to end of the reading operation is different in length from a writing period from start of the writing operation to end of the writing operation, (i) a time point where a read pointer indicative of a current reading position in the frame memory overtakes a write pointer indicative of a current writing position in the frame memory or a time point immediately before the time point or (ii) a time point where the write pointer overtakes the read pointer or a time point immediately before the time point; and a readout reset control section for (i) suspending, at the time point specified by the overtaking time point specifying section, the reading operation of the data, and (ii) conducting again, at a predetermined time point where reading is to be resumed, the reading operation of the data from a position at which the reading operation has been started in the frame memory.

With the arrangement, in a case where the reading operation is higher in operation rate than the writing operation, or in a case where the reading operation is lower in operation rate than the writing operation, the reading operation is suspended at a time point where the read pointer (hereinafter merely referred to as "rp") indicative of a current reading position in the frame memory overtakes the write pointer (hereinafter merely referred to as "wp") indicative of a current writing position in the frame memory or a time point immediately before that time point or at a time point where wp overtakes rp or a time point immediately before that time point, and the reading operation of the data is resumed again, at a predetermined time point where reading is to be resumed, from a position where the reading operation has been started in the frame memory.

Consequently, even if the frame memory has recording capacity corresponding to only one (1) frame (one screen), the host can conduct the writing operation any time without being required to wait at all. Since the host is not required to wait, it is possible to subdue generation of judder, prevent a frame from being dropped, prolong a time for the host to be idle, and ultimately reduce power consumption as a whole. Furthermore, even in a case where the writing operation is slower than the reading operation, it is unnecessary to delay start of the reading operation.

Furthermore, even if tearing occurs, it is possible to make the tearing less distinctive by conducting the reading operation of the data from the position where the reading operation has been started in the frame memory (from the beginning of the data).

Consequently, it is possible to avoid a frame from being dropped, reduce wasteful power consumption, and make tearing less distinctive even if tearing occurs.

A memory control device in accordance with second aspect of the present invention may be an arrangement of the first aspect, wherein in a case where the reading operation is higher in operation rate than the writing operation, the predetermined time point where reading is to be resumed is a time point delayed from the start of the reading operation by at least a difference between the writing period and the readout period.

With the arrangement, in the case where the reading operation is higher in operation rate than the writing operation, the host is not required to wait in order to avoid tearing, and even if tearing occurs, the tearing can be made less distinctive.

A memory control device in accordance with third aspect of the present invention may be an arrangement of the first aspect, wherein in a case where the reading operation is higher in operation rate than the writing operation, the predetermined time point where reading is to be resumed is a time point which precedes, by the readout period, the end of the writing operation.

With the arrangement, in the case where the reading operation is higher in operation rate than the writing operation, the host is not required to wait in order to avoid tearing, and even if tearing occurs, the tearing can be made less distinctive.

A memory control device in accordance with fourth aspect of the present invention may be an arrangement of the first aspect, wherein in a case where the writing operation is higher in operation rate than the reading operation, the predetermined time point where reading is to be resumed is a time point where the reading operation has been suspended.

With the arrangement, in the case where the writing operation is higher in operation rate than the reading operation, the host is not required to wait in order to avoid tearing, and even if tearing occurs, the tearing can be made less distinctive.

A memory control device in accordance with fifth aspect of the present invention may be an arrangement of any one of the first through fourth aspects, wherein in a case where the reading operation of the data is conducted again, the reset control section retransmits a vertical sync signal.

With the arrangement, by retransmitting the vertical sync signal (hereinafter merely referred to as "Vsync"), it is possible to reset the display control section so that the reading operation of the data can be conducted again from the position where the reading operation has been conducted in the frame memory.

A mobile terminal in accordance with sixth aspect of the present invention preferably comprises the memory control device in accordance with any one of the first through fifth aspects.

With the arrangement, it is possible to realize a mobile terminal capable of avoiding a frame from being dropped, reducing wasteful power consumption, and making tearing less distinctive even if tearing occurs.

[Additional Matter]

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature can be formed by combining technical means disclosed in different embodiments.

INDUSTRIAL APPLICABILITY

The present invention is applicable to a memory control device etc. which conducts a writing operation in which data transferred from a host processor is written in a frame memory and a reading operation in which the data is read out from the frame memory so as to transfer the data to a display panel.

REFERENCE SIGNS LIST

1 Image transfer system
2 Host processor (host, memory control device)
3 LCD controller (memory control device)
4 LCD (display control section)
10 Mobile terminal
32 Frame memory
32 Readout reset control section
34 Determination section (overtaking time point specifying section)
Tin Writing period
Tout Readout period

The invention claimed is:

1. A memory control device which conducts (i) a writing operation in which data transferred from a host is written in a frame memory and (ii) a reading operation in which the data is read out from the frame memory so as to transfer the data to a display controller, the memory control device comprising:

an overtaking time point specifying controller that specifies, in a case where a readout period from start of the reading operation to end of the reading operation is different in length from a writing period from start of the writing operation to end of the writing operation, (i) a time point where a read pointer indicative of a current reading position in the frame memory overtakes a write pointer indicative of a current writing position in the frame memory or a time point immediately before the time point or (ii) a time point where the write pointer overtakes the read pointer or a time point immediately before the time point; and a readout reset controller that (i) suspends, at the time point specified by the overtaking time point specifying controller, the reading operation of the data, and (ii) conducts again, at a predetermined time point where reading is to be resumed, the reading operation of the data from a position at which the reading operation has been started in the frame memory.

2. The memory control device as set forth in claim 1, wherein, in a case where the reading operation is higher in operation rate than the writing operation, the predetermined time point where reading is to be resumed is a time point delayed from the start of the reading operation by at least a difference between the writing period and the readout period.

3. The memory control device as set forth in claim 1, wherein, in a case where the reading operation is higher in operation rate than the writing operation, the predetermined time point where reading is to be resumed is a time point which precedes, by the readout period, the end of the writing operation.

4. The memory control device as set forth in claim 1, wherein, in a case where the writing operation is higher in operation rate than the reading operation, the predetermined time point where reading is to be resumed is a time point where the reading operation has been suspended.

5. The memory control device as set forth in any one of claim 1, wherein, in a case where the reading operation of the data is conducted again, the readout reset controller retransmits a vertical sync signal.

6. A mobile terminal, comprising a memory control device as set forth in any one of claim 1.

7. A non-transitory computer-readable recording medium, in which a memory control program for causing a computer to function as a memory control device as set forth in claim 1 is recorded, the memory control program causing the computer to function as the display controller, the overtaking time point specifying controller, and the readout reset controller of the memory control device.

* * * * *